(12) United States Patent
Fujimoto et al.

(10) Patent No.: US 12,539,778 B2
(45) Date of Patent: Feb. 3, 2026

(54) WIRELESS POWER TRANSFER SYSTEM, POWER TRANSMISSION DEVICE, AND POWER RECEPTION DEVICE

(71) Applicants: THE UNIVERSITY OF TOKYO, Tokyo (JP); BRIDGESTONE CORPORATION, Tokyo (JP); NSK Ltd., Tokyo (JP)

(72) Inventors: Hiroshi Fujimoto, Tokyo (JP); Osamu Shimizu, Tokyo (JP); Keizo Akutagawa, Tokyo (JP); Yasumichi Wakao, Tokyo (JP); Isao Kuwayama, Tokyo (JP); Daisuke Gunji, Fujisawa (JP)

(73) Assignees: THE UNIVERSITY OF TOKYO, Tokyo (JP); BRIDGESTONE CORPORATION, Tokyo (JP); NSK Ltd., Tokyo (JP)

( * ) Notice: Subject to any disclaimer, the term of this patent is extended or adjusted under 35 U.S.C. 154(b) by 916 days.

(21) Appl. No.: 17/754,666

(22) PCT Filed: Sep. 10, 2020

(86) PCT No.: PCT/JP2020/034376
§ 371 (c)(1),
(2) Date: Apr. 8, 2022

(87) PCT Pub. No.: WO2021/070553
PCT Pub. Date: Apr. 15, 2021

(65) Prior Publication Data
US 2023/0088378 A1    Mar. 23, 2023

(30) Foreign Application Priority Data
Oct. 9, 2019  (JP) .................................. 2019-186300

(51) Int. Cl.
*B60L 53/126* (2019.01)
*B60L 5/00* (2006.01)
(Continued)

(52) U.S. Cl.
CPC ............. *B60L 53/126* (2019.02); *B60L 5/005* (2013.01); *B60L 9/00* (2013.01); *B60L 53/12* (2019.02); *H02J 50/10* (2016.02)

(58) Field of Classification Search
CPC ........ H02J 50/10; B60L 53/126; B60L 53/12; B60L 9/00; B60L 5/005
See application file for complete search history.

(56) References Cited

U.S. PATENT DOCUMENTS 5,573,090 A * 11/1996 Ross ...................... B60L 5/005
                                                    320/109
8,008,888 B2 * 8/2011 Oyobe .................... H02J 50/12
                                                    320/108
(Continued)

FOREIGN PATENT DOCUMENTS

CN       105966259 A    9/2016
DE    102017218014 A1   4/2019
(Continued)

OTHER PUBLICATIONS

Dec. 8, 2020, International Search Report issued in the International Patent Application No. PCT/JP2020/034376.
(Continued)

*Primary Examiner* — Cheng Lin
(74) *Attorney, Agent, or Firm* — KENJA IP LAW PC (57) ABSTRACT

A wireless power transfer system 1 includes a power transmission device 2 and a power reception device 3. The power transmission device 2 is a power transmission device 2 installed in a road 4, is provided with a power transmission coil 21 that transmits power wirelessly, and is configured (Continued)

such that when installed in the road 4, the normal line of a coil plane of the power transmission coil 21 is inclined with respect to the normal line of the road surface of the road 4 in a lateral cross section of the road 4. The power reception device 3 is provided with a power reception coil 31 that receives power wirelessly, and at least a portion of the power reception coil 31 is housed in the wheel 6 of the moving body 5.

16 Claims, 8 Drawing Sheets

(51) Int. Cl.
*B60L 9/00* (2019.01)
*B60L 53/12* (2019.01)
*H02J 50/10* (2016.01)

(56) References Cited

U.S. PATENT DOCUMENTS

| | | | | |
|---|---|---|---|---|
| 8,662,221 | B2* | 3/2014 | Ueno | B60L 9/00 |
| | | | | 180/65.51 |
| 9,997,964 | B2* | 6/2018 | Maekawa | B60L 53/124 |
| 11,171,520 | B2 | 11/2021 | Kanno | |
| 2016/0023557 | A1* | 1/2016 | Dimke | B60L 53/36 |
| | | | | 320/108 |
| 2016/0257209 | A1* | 9/2016 | Lewis | B60L 53/126 |
| 2017/0282732 | A1* | 10/2017 | Lewis | B60L 5/005 |
| 2018/0037126 | A1* | 2/2018 | Jang | H02J 50/12 |
| 2018/0178666 | A1* | 6/2018 | Javaid | H02J 50/90 |

FOREIGN PATENT DOCUMENTS

| | | | |
|---|---|---|---|
| JP | H08126106 A | | 5/1996 |
| JP | H0917667 A | | 1/1997 |
| JP | 2005073313 A | | 3/2005 |
| JP | 2009106136 A | | 5/2009 |
| JP | 2011135772 A | | 7/2011 |
| JP | 2013115915 A | * | 6/2013 |
| JP | 2014195350 A | * | 10/2014 |
| JP | 2015079822 A | * | 4/2015 |
| JP | 2016076605 A | | 5/2016 |
| JP | 2016152759 A | | 8/2016 |
| JP | 2018007524 A | | 1/2018 |
| JP | 2018068077 A | | 4/2018 |
| JP | 2018148681 A | | 9/2018 |

OTHER PUBLICATIONS

Apr. 12, 2022, International Preliminary Report on Patentability issued in the International Patent Application No. PCT/JP2020/034376.

Jun. 5, 2024, search result of Office Action issued by the China National Intellectual Property Administration in the corresponding Chinese Patent Application No. 202080071122.3.

Nov. 14, 2023, search result of the Extended European Search Report issued by the European Patent Office in the corresponding European Patent Application No. 20875386.3.

Oct. 25, 2023, search result of Office Action issued by the China National Intellectual Property Administration in the corresponding Chinese Patent Application No. 202080071122.3.

Osamu Shimizu et al., Mutual Inductance Modeling of In-wheel Arc-shaped Coil for In-motion WPT, 2019, 2019 IEEE Wireless Power Transfer Conference (WPTC), pp. 624-628, XP033753519.

\* cited by examiner

WIRELESS POWER TRANSFER SYSTEM, POWER TRANSMISSION DEVICE, AND POWER RECEPTION DEVICE

TECHNICAL FIELD

The present disclosure relates to a wireless power transfer system, a power transmission device, and a power reception device.

BACKGROUND

In the related art, a wireless power transfer technology is known in which a power transmission device provided in a road surface such as a road supplies power wirelessly to a power reception device installed in a vehicle. For example, PTL 1 discloses a vehicle provided with a power reception device on the underside of the vehicle, which enables the vehicle to receive power from a power transmission device provided in a road surface.

CITATION LIST

Patent Literature

PTL 1: Japanese Patent Laid-Open No. 2018-068077

SUMMARY

Technical Problem

However, in the wireless power transfer technology of the related art, if the power transmission device provided in a road surface such as a road and the power reception device installed in a moving body that travels on the road are too far apart, an obstacle such as a small animal or piece of metal may come into the space between the power transmission device and the power reception device, eddy currents may be generated around the obstacle, and the power transfer efficiency may be lowered. Moreover, the small animal, piece of metal, or the like that has come between the power transmission device and the power reception device may heat up and catch fire. For this reason, there is a demand for further improvement in the usefulness of wireless power transfer technology for supplying power wirelessly to a moving body.

A purpose of the present disclosure devised in the light of such circumstances is to provide a wireless power transfer system, a power transmission device, and a power reception device with which the usefulness of wireless power transfer can be improved.

Solution to Problem

A wireless power transfer system according to the present disclosure comprises:

a power transmission device installed in a road and provided with a power transmission coil that transmits power wirelessly, the power transmission device being configured such that when installed in the road, the normal line of the coil plane of the power transmission coil is inclined with respect to the normal line of the road surface of the road in a lateral cross section of the road; and a power reception device provided with a power reception c oil that receives power wirelessly, at least a portion of the power reception coil being housed in a wheel of a moving body.

A power transmission device according to the present disclosure is provided with a power transmission coil that transmits power wirelessly, and is configured such that when installed in a road, the normal line of the coil plane of the power transmission coil is inclined with respect to the normal line of the road surface of the road in a lateral cross section of the road.

A power reception device according to the present disclosure is provided with a power reception coil that receives power wirelessly, and is configured such that in the state in which at least a portion of the power reception coil is housed in a wheel of a moving body, the normal line of the coil plane of the power reception coil is inclined with respect to the normal line of a contact patch of the wheel with the road surface in a lateral cross section of the moving body.

Advantageous Effect

According to the present disclosure, it is possible to provide a wireless power transfer system, a power transmission device, and a power reception device with which the usefulness of wireless power transfer can be improved.

DETAILED DESCRIPTION

Hereinafter, a wireless power transfer system, power transmission device, and power reception device according to an embodiment of the present disclosure will be described with reference to the drawings. In the drawings, common components and parts are denoted with the same signs. In this specification, the lateral direction of a wheel refers to the direction parallel to the rotation axis of the wheel. The radial direction of a wheel refers to the direction orthogonal to the rotation axis of the wheel. The extension direction of a road or traffic lane refers to the direction in which the road or traffic lane extends. The lateral direction of a road or traffic lane refers to the direction orthogonal to the extension direction. The lateral direction of a moving body refers to the direction orthogonal to the direction in which the moving body travels.

(Configuration of Wireless Power Transfer System)

Figure 1:
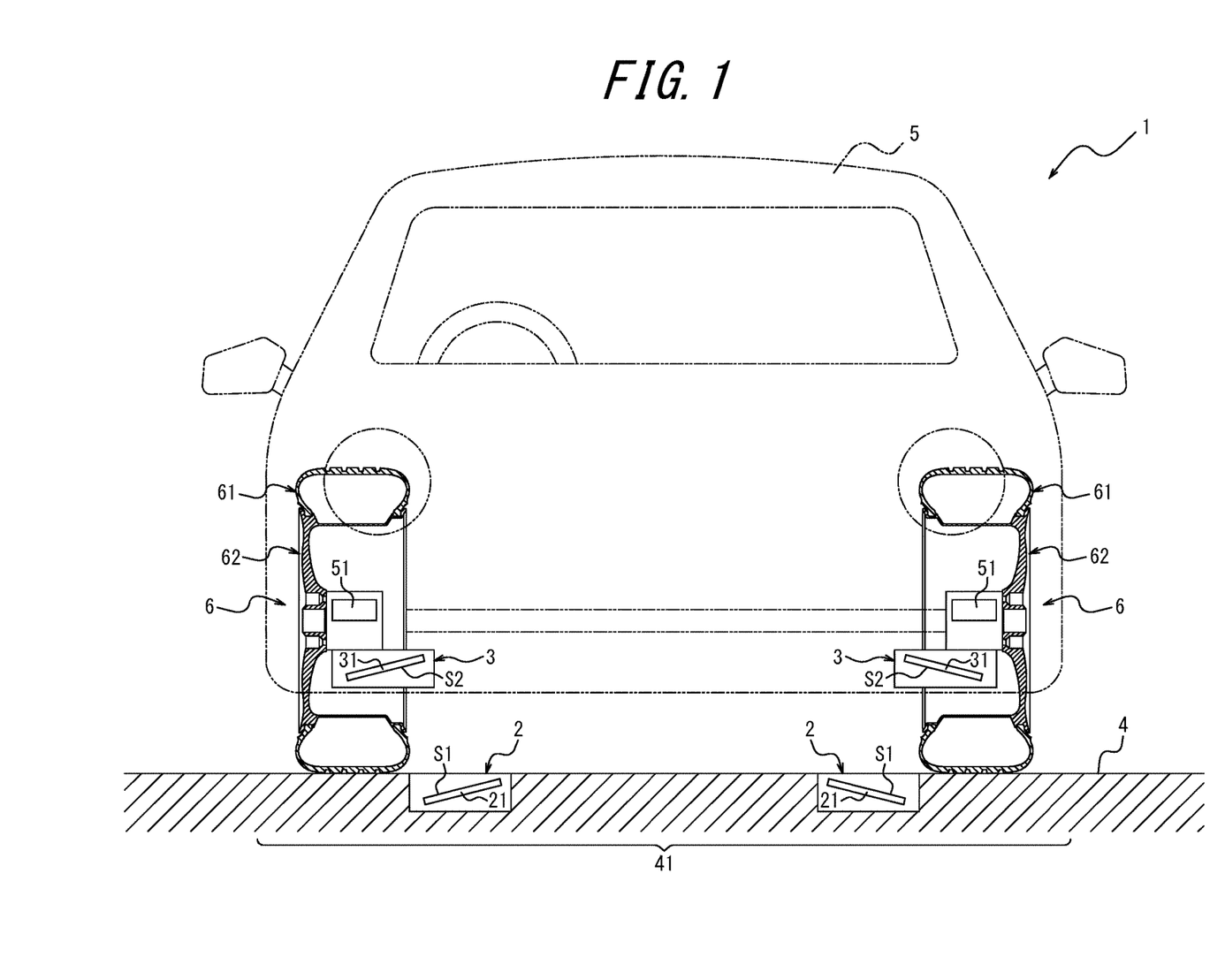
FIG. 1 is a schematic diagram that uses a lateral cross section of wheels to generally illustrate a wireless power transfer system according to an embodiment of the present disclosure.
Figure 2:
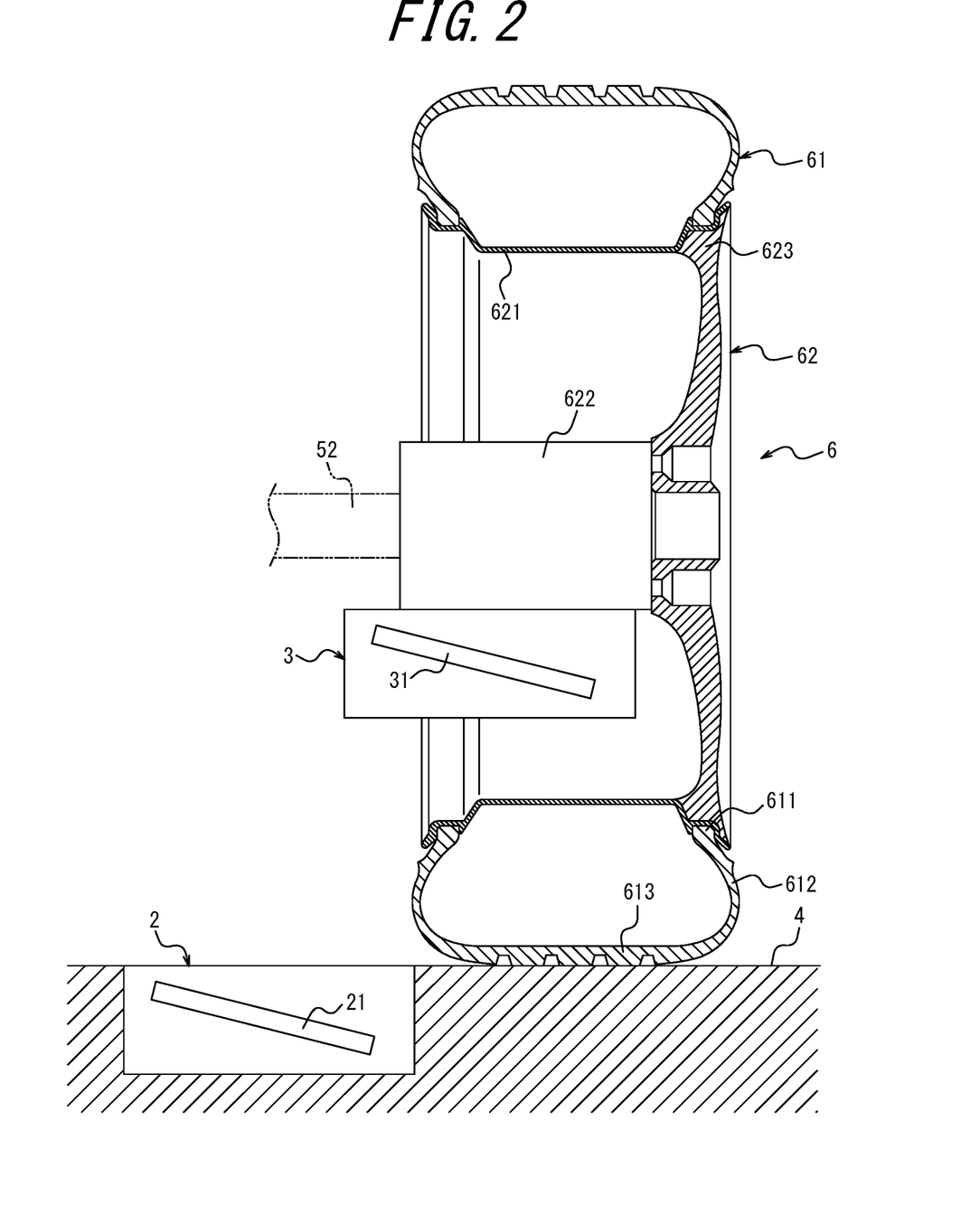
FIG. 2 is a schematic diagram that uses a lateral cross section of a wheel to generally illustrate a tire and wheel assembly as one example of a wheel in the wireless power transfer system according to an embodiment of the present disclosure.

FIGS. 1 and 2 will be referenced to describe a configuration of a wireless power transfer system 1 according to an embodiment of the present disclosure.

FIG. 1 illustrates a schematic diagram that uses a lateral cross section of wheels 6 of a moving body 5 to generally illustrate the wireless power transfer system 1 according to an embodiment of the present disclosure. The wireless power transfer system 1 includes a power transmission device 2 and a power reception device 3. The power transmission device 2 is installed in a road 4. The power reception device 3 is installed in a moving body 5. With this arrangement, in the wireless power transfer system 1, power is transmitted wirelessly from the power transmission device 2 to the power reception device 3 when the moving body 5 travels on the road 4 in the extension direction of the road 4.

The power transmission device 2 is provided with a power transmission coil 21. The power transmission coil 21 transmits power wirelessly through the power transmission coil 21. The power transmission coil 21 is positioned lower than the road surface of the road 4 in the direction perpendicular to the road surface. Specifically, the power transmission coil 21 is embedded below the road surface of the road 4. In the present embodiment, the power transmission coil 21 is embedded below the road surface of the road 4 such that at least a portion of the power transmission coil 21 is exposed on the road surface of the road 4. In FIG. 1, the power transmission coil 21 is illustrated schematically for simplicity.

The power reception device 3 is provided with a power reception coil 31. The power reception coil 31 receives power transmitted wirelessly from the power transmission coil 21 of the power transmission device 2. The power reception device 3 is installed in a moving body 5. In the present embodiment, at least a portion of the power reception coil 31 of the power reception device 3 is housed in the wheel 6 of the moving body 5. In the present embodiment, the power reception device 3 is attached to the wheel 6 of the moving body 5 such that at least a portion of the power reception coil 31 is housed in the wheel 6 of the moving body 5. However, the power reception device 3 may also be attached to the main body of the moving body 5 such that at least a portion of the power reception coil 31 is housed in the wheel 6 of the moving body 5. In FIG. 1, the power reception coil 31 is illustrated schematically for simplicity.

The road 4 has a road surface used for transportation by the moving body 5. In this specification, the "road surface" is the surface of the road 4 on which the moving body 5 travels by the wheel 6. In the present embodiment, the road 4 is a street. However, the road 4 is not limited to a street and may also include a walkway, a farm road, a forest road, a runway, a parking lot, a vacant lot, or an open space, for example. Transportation by the moving body 5 includes the driving, stopping, and parking of the moving body 5.

At least one traffic lane 41 may be provided on the road surface of the road 4. The traffic lane 41 is an area of the road surface demarcated as an area in which the moving body 5 travels. The road 4 may also be provided with a plurality of traffic lanes 41 according to the number of moving bodies 5 that can travel alongside each other. The road surface of the road 4 may be painted with demarcation lines such as white lines to indicate the traffic lane 41.

In the present embodiment, the road surface of the road 4 is paved with asphalt, for example. However, the road surface of the road 4 is not limited to asphalt and may also be configured using a material such as concrete, stone, brick, dirt, and sand.

The moving body 5 travels over the road surface of the road 4 by the wheel 6. In the present embodiment, the moving body 5 is an automobile that includes a motor as a source of motive power, such as an electric vehicle or a hybrid vehicle, for example. The automobile is a vehicle such as a passenger vehicle, a truck, a bus, and a motorcycle. However, the moving body 5 is not limited to an automobile, and may also be an agricultural vehicle such as a tractor, an industrial or construction vehicle such as a dump truck, an aircraft, a helicopter, a motorized bicycle, an electric bicycle, an electric wheelchair, and the like.

The wheel 6 is used to move the moving body 5. The wheel 6 has a contact patch that contacts the road surface of the road 4 while attached to the moving body 5. In the present embodiment, the wheel 6 is a tire and wheel assembly obtained by mounting a tire 61 onto a wheel 62, but is not limited thereto. In this specification, in the case where the wheel 6 is a tire and wheel assembly, the "contact patch" of the wheel 6 refers to the contact patch of the tire 61, or in other words, the surface of the tire 61 that touches the road surface in the state in which the tire 61 is mounted onto an applicable rim, inflated to a prescribed internal pressure, and subjected to a maximum load.

In this specification, an "applicable rim" refers to a valid industrial standard in the region where a pneumatic tire is manufactured and used, namely, an approved rim for an applicable size described in a publication such as the JATMA Year Book of the Japan Automobile Tyre Manufacturers Association (JATMA) in Japan, the Standards Manual of the European Tyre and Rim Technical Organization (ETRTO) in Europe, or the Year Book of the Tire and Rim Association, Inc. (TRA) in the United States or to be described in the future (the Measuring Rim in the ETRTO Standards Manual or the Design Rim in the TRA Year Book), but in the case of a size not described in the above industrial standards, the applicable rim refers to a rim of a width corresponding to the bead width of the pneumatic tire. The "applicable rim" includes sizes that may be included in the above industrial standards in the future in addition to current sizes. The "sizes to be described in the future" may include the sizes described as "Future Developments" in the ETRTO 2013 edition, for example.

In this specification, the "prescribed internal pressure" refers to the air pressure (maximum air pressure) corresponding to the maximum load capability of a single wheel for the applicable size and ply rating described in an industrial standard such as the JATMA Year Book described above, but in the case of a size not described in the above industrial standards, the prescribed internal pressure refers to the air pressure (maximum air pressure) corresponding to the maximum load capability prescribed for each vehicle on which the tires are mounted. Also, in this specification, the "maximum load" refers to the load corresponding to the maximum load capability for a tire of applicable size described in the above industrial standards, or in the case of a size not described in the above industrial standards, the load corresponding to the maximum load capability prescribed for each vehicle on which the tires are mounted.

FIG. 2 illustrates a schematic diagram that uses a lateral cross section of the wheel 6 to generally illustrate a tire and wheel assembly as one example of the wheel 6 in the wireless power transfer system 1 according to an embodiment of the present disclosure.

As illustrated in FIG. 2, the tire 61 includes a pair of bead portions 611, a pair of sidewall portions 612, and a tread portion 613. The bead portions 611 are configured such that the inner radial side and outer lateral side of the bead portions 611 touch a rim portion 621 of the wheel 62 when the tire 61 is mounted onto the rim portion 621. The sidewall portions 612 extend between the tread portion 613 and the bead portions 611. The sidewall portions 612 are positioned farther outward than the bead portions 611 in the radial direction of the wheel 6. The tread portion 613 is positioned farther outward than the sidewall portions 312 in the radial direction of the wheel 6, and includes the contact patch of the tire 61.

The tire 61 is formed using a rubber such as natural rubber and synthetic rubber, and may include parts such as a carcass, a belt, and bead wires formed using a metal such as steel. For example, at least a portion of the parts such as the carcass, belt, and bead wires may also be formed using a nonmagnetic material. With this configuration, the strength of the tire 61 can be maintained, while in addition, due to the existence of a metal between the power transmission device 2 and the power reception device 3, the tire 61 can lessen the attenuation of a magnetic field generated by the power transmission coil 21 before the magnetic field reaches the power reception coil 31, and by extension, improve the power transfer efficiency of the wireless power transfer from the power transmission device 2 to the power reception device 3. However, at least a portion of the parts such as the carcass, belt, and bead wires does not have to be formed using a nonmagnetic material.

The nonmagnetic material may include a paramagnetic material or a diamagnetic material having a low permeability. For example, a resin material containing a thermoplastic resin such as polyester and nylon, a thermosetting resin such as a vinyl ester resin and an unsaturated polyester resin, and some other synthetic resin can be used as the nonmagnetic material. Furthermore, fibers of a material such as glass, carbon, graphite, aramid, polyethylene, and ceramic can be included in the resin material as reinforcing fibers. The nonmagnetic material is not limited to a resin, and any nonmetallic material containing rubber, glass, carbon, graphite, aramid, polyethylene, ceramic, and the like can be used. Furthermore, a metal material containing a paramagnetic material such as aluminum or a diamagnetic material such as copper can be used as the nonmagnetic material.

The wheel 62 includes a cylindrical rim portion 621 for mounting the tire 61, hub portion 622 which is provided in the inner radial side of the rim portion 621 and which is secured to a shaft 52 of the moving body 5, and a disc portion 623 which is supported by and secured to the hub portion 622 and also supports and secures the rim portion 621.

The wheel 62 may be formed using a metal such as steel, but is not limited thereto. At least a portion of the rim portion 621, the hub portion 622, and the disc portion 623 of the wheel 62 may be formed using the nonmagnetic material described above. With this configuration, the strength of the wheel 62 can be maintained, while in addition, due to the existence of a metal such as steel between the power transmission device 2 and the power reception device 3, the wheel 62 can lessen the attenuation of a magnetic field generated by the power transmission coil 21 before the magnetic field reaches the power reception coil 31, and by extension, improve the power transfer efficiency of the wireless power transfer from the power transmission device 2 to the power reception device 3. However, at least a portion of the rim portion 621, the hub portion 622, and the disc portion 623 of the wheel 62 does not have to be formed using a nonmagnetic material.

In FIG. 2, the power reception device 3 is attached to the hub portion 622 of the wheel 62. In this state, at least a portion of the power reception coil 31 is housed in the wheel 6. "Housed in the wheel" means being disposed farther inward than the lateral sides of the wheel, on the inner radial side from the outer circumferential surface of the wheel. In the present embodiment, the majority of the power reception coil 31 is housed in the wheel 6.

The power reception device 3 is disposed in a location of the wheel 6 that does not rotate in association with the rotation of the wheel 6 such as a cover of the hub portion 622 of the wheel 62. With this arrangement, the relative position of the power reception coil 31 inside the wheel 6 does not change depending on the rotation of the tire 61, thereby making it easy to provide a stable supply of power to the power reception device 3 wirelessly from outside the wheel 6.

The ratio of the portion of the power reception coil 31 housed in the wheel 6 of the moving body 5 relative to the whole may be determined in any way. A higher ratio of the portion of the power reception coil 31 housed in the wheel 6 relative to the whole means that an obstacle will not come into the space between the power transmission coil 21 and the power reception coil 31 as easily when transferring power from the power transmission coil 21. On the other hand, a lower ratio of the portion of the power reception coil 31 housed in the wheel 6 relative to the whole means that the magnetic field generated by the power transmission coil 21 will not attenuate as much before reaching the power reception coil 31 when transferring power from the power transmission coil 21.

The power reception device 3 is not limited to the hub portion 622 of the wheel 62, and may be installed at any location in the wheel 6. For example, the power reception device 3 may also be installed on the inner circumferential surface of the rim portion 621 or the outer circumferential surface of the rim portion 621 of the wheel 62. Moreover, the power reception device 3 may also be installed on the inner circumferential surface of the tread portion 613 of the tire 61, or inside the tread portion 613 of the tire 61. By installing the power reception device 3 at a position close to the contact patch of the tire 61, the distance is shortened between the power transmission device 2 and the power reception device 3 while the moving body 5 is traveling on the road 4, and the power transfer efficiency can be improved further.

(Configuration of Power Transmission Device)

Figure 3:
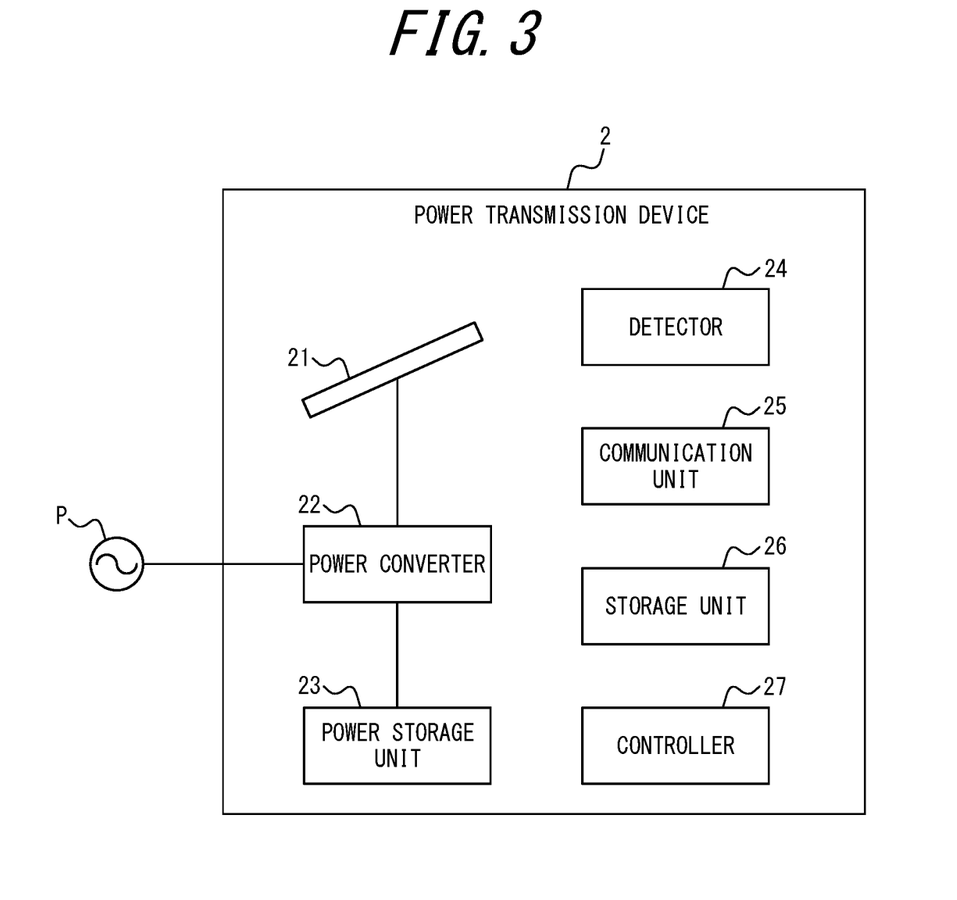
FIG. 3 is a function block diagram schematically illustrating a configuration example of a power transmission device according to an embodiment of the present disclosure.
Figure 4:
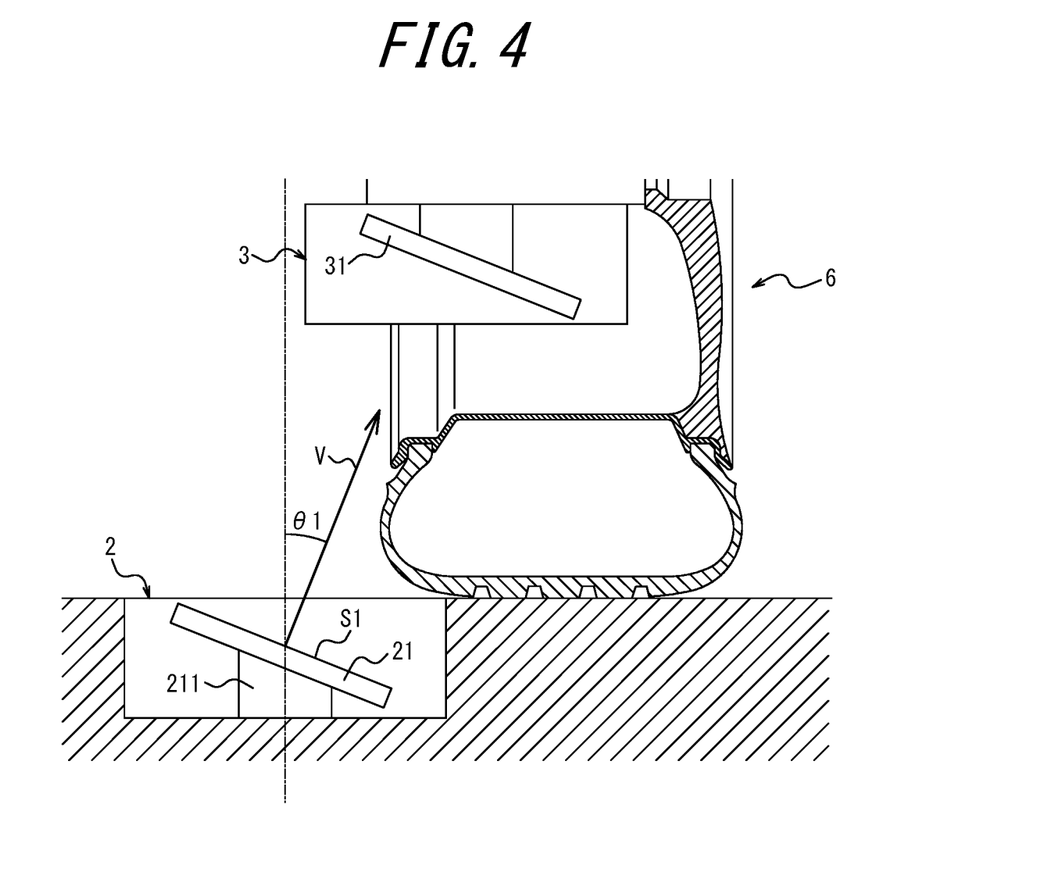
FIG. 4 is a schematic diagram that uses a lateral cross section of a road to generally illustrate the coil plane and inclination of a power transmission coil provided in the power transmission device according to an embodiment of the present disclosure.

Next, FIGS. 3 and 4 will be referenced to describe a configuration of the power transmission device 2 included in the wireless power transfer system 1 according to an embodiment of the present disclosure.

FIG. 3 illustrates a function block diagram schematically illustrating a configuration example of the power transmission device 2 according to an embodiment of the present disclosure. As illustrated in FIG. 3, the power transmission device 2 is provided with a power converter 22, a power storage unit 23, a detector 24, a communication unit 25, a storage unit 26, and a controller 27 in addition to the power transmission coil 21. The power transmission coil 21, the power converter 22, the power storage unit 23, the detector 24, the communication unit 25, the storage unit 26, and the controller 27 are communicably interconnected in a wired or wireless way over a network such as a local area network (LAN), for example.

The power transmission coil 21 generates an AC magnetic field. In the present embodiment, the power transmission coil 21 is configured into a loop overall. In this specification, the plane enclosed by the looped power transmission coil 21 is also referred to as the coil plane S1 of the power transmission coil 21. In other words, the power transmission coil 21 is wound in the in-plane direction of the coil plane S1 to form the coil plane S1. The power transmission coil 21 can generate an AC magnetic field pointing in the direction perpendicular to the power transmission coil 21, or in other words, pointing in the direction in which the normal line of the coil plane S1 extends.

FIG. 4 illustrates a schematic diagram that uses a lateral cross section of a road to generally illustrate the coil plane S1 and inclination of the power transmission coil 21 provided in the power transmission device 2 according to an embodiment of the present disclosure. As illustrated in FIG. 4, the power transmission device 2 is configured such that when installed in the road 4, the normal line of the coil plane S1 of the power transmission coil 21 is inclined with respect to the normal line of the road surface in a lateral cross section of the road 4. In other words, when installed in the road 4, the coil plane S1 of the power transmission coil 21 is inclined with respect to the road surface in a lateral cross section of the road 4. More specifically, when the power transmission device 2 is installed in the road 4, the power transmission coil 21 is supported by and secured to a housing of the power transmission device 2 through a supporting member 211 such that the normal line V of the coil plane S1 has an inclination θ1 with respect to the normal line of the road surface in a lateral cross section of the road 4. The inclination θ1 may be set to any angle within a range whereby the normal line of the coil plane S1 of the power transmission coil 21 is not parallel to the normal line of the road surface. At least a portion of the supporting member 211 and the housing of the power transmission device 2 may be formed using the nonmagnetic material described above. With this configuration, the magnetic field generated by the power transmission coil 21 is not attenuated as easily when passing through the supporting member 211 and the housing of the power transmission device 2.

Referring to FIG. 3 again, the power converter 22 is connected to the power transmission coil 21. The power converter 22 includes an AC/DC converter and an inverter, for example. The power converter 22 converts power transmitted from a power source P outside the power transmission device 2 or from the power storage unit 23, and transmits the power to the power transmission coil 21.

The power storage unit 23 is connected to the power converter 22. For example, the power storage unit 23 includes a storage battery that can charge and discharge power, such as a lead storage battery, a nickel-metal hydride battery, a lithium-ion battery, and a sodium-sulfur battery, for example. The power storage unit 23 is not limited to a storage battery and may also include a capacitor or the like. The power storage unit 23 stores power transmitted from the power source P or transmits power to the power transmission coil 21 through the power converter 22.

The detector 24 includes a sensor such as an infrared sensor, an image sensor, a motion sensor, and a pressure sensor, for example. The detector 24 detects a state in which the power reception device 3 exists at a position where power can be received from the power transmission device 2.

The communication unit 25 includes one or more communication modules. The communication module(s) may be a wired LAN communication module, a wireless LAN communication module, or a controller area network (CAN) communication module, for example. The communication unit 25 achieves communication with an external computer or the like over a network such as the Internet.

The storage unit 26 is a memory such as semiconductor memory, magnetic memory, or optical memory, for example. The storage unit 26 functions as main memory, auxiliary memory, or cache memory, for example. The storage unit 26 stores information of any type used in the operation of the power transmission device 2. For example, the storage unit 26 stores a system program, an application program, embedded software, and the like.

The controller 27 includes one or more processors. The processor(s) may be a general-purpose processor such as a central processing unit (CPU) or a dedicated processor specialized for a specific task, for example. The controller 27 is not limited to a processor and may also include one or more dedicated circuits. The dedicated circuit(s) may be a field-programmable gate array (FPGA) or an application-specific integrated circuit (ASIC), for example. The controller 27 controls the power transmission coil 21, power converter 22, power storage unit 23, detector 24, communication unit 25, and storage unit 26 described above to achieve the functions of the power transmission device 2.

The controller 27 can determine whether or not the power reception device 3 exists at a position where power can be received from the power transmission device 2. Specifically, the controller 27 detects the power reception device 3 with the detector 24, and thereby determines that the power reception device 3 exists at a position where power can be received from the power transmission device 2. The controller 27 may also detect the moving body 5 or the wheel 6 with the detector 24, and thereby indirectly determine that the power reception device 3 exists at a position where power can be received from the power transmission device 2. Alternatively, the controller 27 may acquire information indicating that the power reception device 3 exists at a position where power can be received from the power transmission device 2 from the power reception device 3 or an external computer through the communication unit 25.

In the case of determining that the power reception device 3 exists at a position where power can be received from the power transmission device 2, the controller 27 can transmit power wirelessly. Specifically, the controller 27 can control at least one of the power transmission coil 21, the power converter 22, and the power storage unit 23 to generate an AC magnetic field pointing in the direction in which the normal line of the coil plane S1 of the power transmission coil 21 extends.

(Configuration of Power Reception Device)

Figure 5:
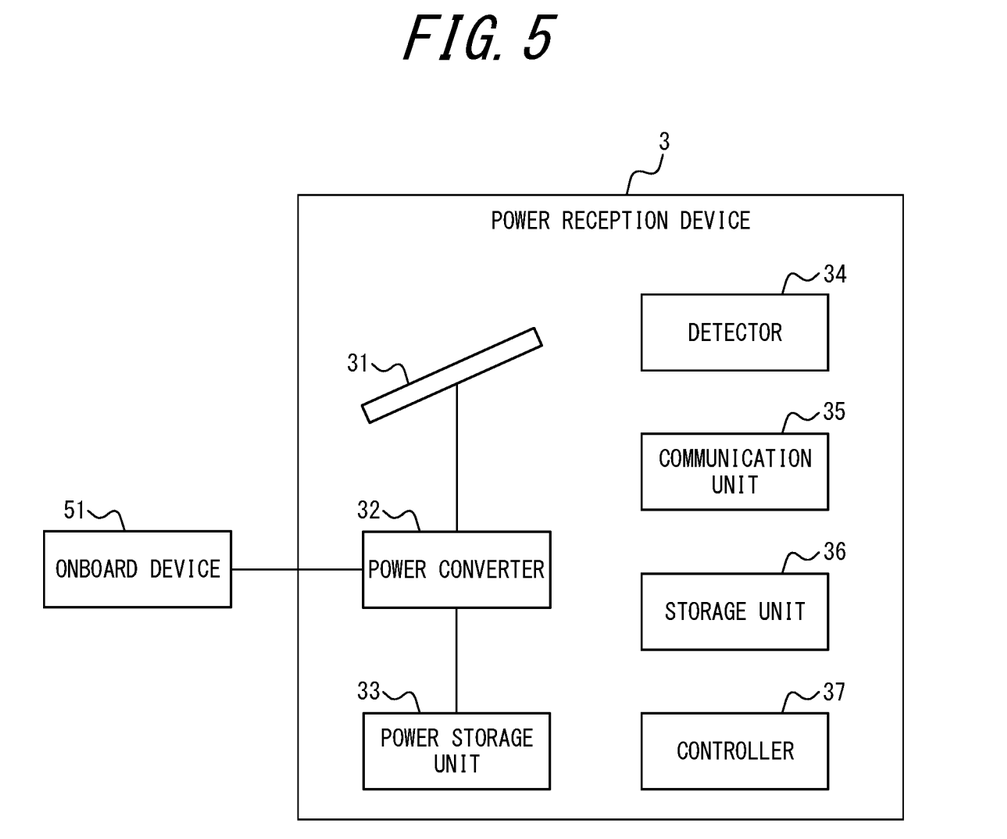
FIG. 5 is a function block diagram schematically illustrating a configuration example of a power reception device according to an embodiment of the present disclosure.
Figure 6:
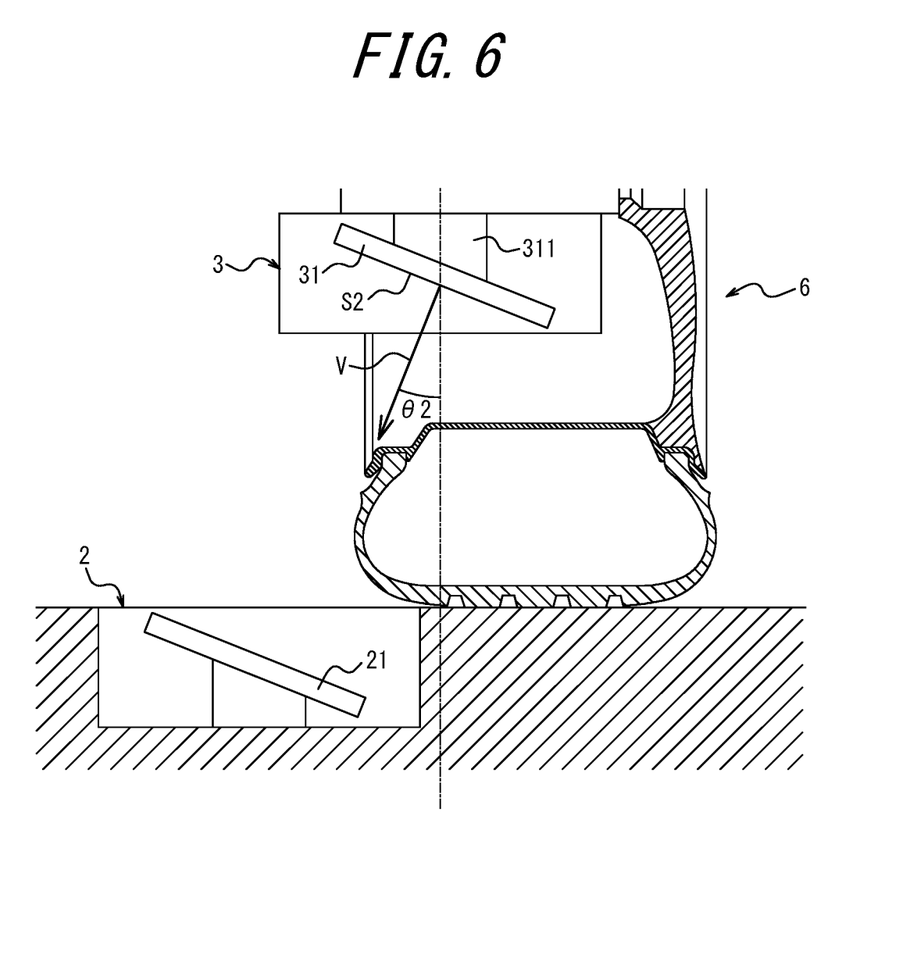
FIG. 6 is a schematic diagram that uses a lateral cross section of a road to generally illustrate the coil plane and inclination of a power reception coil provided in the power reception device according to an embodiment of the present disclosure.

Next, FIGS. 5 and 6 will be referenced to describe a configuration of the power reception device 3 included in the wireless power transfer system 1 according to an embodiment of the present disclosure.

FIG. 5 illustrates a function block diagram schematically illustrating a configuration example of the power reception device 3 according to an embodiment of the present disclosure. As illustrated in FIG. 5, the power reception device 3 is provided with a power converter 32, a power storage unit 33, a detector 34, a communication unit 35, a storage unit 36, and a controller 37 in addition to the power reception coil 31. The power reception coil 31, the power converter 32, the power storage unit 33, the detector 34, the communication unit 35, the storage unit 36, and the controller 37 are communicably interconnected in a wired or wireless way over a network such as a CAN, for example.

The power reception coil 31 receives power wirelessly. In the present embodiment, the power reception coil 31 is configured into a loop overall. In this specification, the plane enclosed by the looped power reception coil 31 is also referred to as the coil plane S2 of the power reception coil 31. In other words, the power reception coil 31 is wound in the in-plane direction of the coil plane S2 to form the coil plane S2. The variation of the AC magnetic field which is generated by the power transmission coil 21 and the like and which passes through the coil plane S2 induces an electromotive force by electromagnetic induction, thereby causing a current to run through the power reception coil 31.

FIG. 6 is a schematic diagram generally illustrating the coil plane S2 and inclination of the power reception coil 31 provided in the power reception device 3 according to an embodiment of the present disclosure. As illustrated in FIG. 6, the power reception device 3 is configured such that in the state in which at least a portion of the power reception coil 31 is housed in the wheel 6 of the moving body 5, the normal line of the coil plane S2 of the power reception coil 31 is inclined with respect to the normal line of the contact patch of the wheel 6 with the road surface in a lateral cross section of the moving body 5. In other words, in the state in which at least a portion of the power reception coil 31 is housed in the wheel 6 of the moving body 5, the coil plane S2 of the power reception coil 31 is inclined with respect to the contact patch of the wheel 6 with the road surface in a lateral cross section of the moving body 5. More specifically, in the state in which at least a portion of the power reception coil 31 is housed in the wheel 6 of the moving body 5, the power reception coil 31 is secured to the housing of the power reception device 3 through a supporting member 311 such that the normal line of the coil plane S2 of the power reception coil 31 has an inclination θ2 with respect to the normal line of the contact patch of the wheel 6 with the road surface in a lateral cross section of the moving body 5. With this configuration, by having the coil plane S2 of the power reception coil 31 face the coil plane S1 of the power transmission coil 21 while the moving body 5 is traveling on the road 4, wireless power transfer from the power transmission coil 21 to the power reception coil 31 by electromagnetic induction is performed. The inclination θ2 may be set to any angle according to factors such as the purpose of the power reception device 3 and the amount of power to be received. At least a portion of the supporting member 311 and the housing of the power reception device 3 may be formed using the nonmagnetic material described above. With this configuration, the magnetic field generated by the power transmission coil 21 is not attenuated as easily when passing through the supporting member 311 and the housing of the power reception device 3.

Here, in this specification, (at least a portion of) a plane A "facing" a plane B for example refers to (at least a portion of) the plane A overlapping inside a region extending perpendicular to the plane B in the range over which the plane B extends (in other words, inside the pillar-shaped region having the plane B as its cross section).

Referring to FIG. 5 again, the power converter 32 is connected to the power reception coil 31. The power converter 32 is provided with an AC/DC converter and an inverter, for example. The power converter 32 transmits power generated in the power reception coil 31 to an onboard device 51 installed in the moving body 5.

The onboard device 51 is a motor, for example. In such a case, the onboard device 51 which is a motor consumes power transmitted from the power reception device 3 to drive the wheel 6. More specifically, in the present embodiment, the onboard device 51 is an in-wheel motor installed in the wheel 6. However, the onboard device 51 may also be an onboard motor which is installed in the body of the moving body 5 and which causes the wheel 6 to be driven by rotating the shaft 52 of the moving body 5.

The onboard device 51 is not limited to a motor and may also include any electronic devices installed in the moving body 5, such as a storage battery, communication equipment, a car navigation system, a media player, and in-vehicle sensors.

The power storage unit 33 is connected to the power converter 32. For example, the power storage unit 33 includes a battery that can charge and discharge power, such as a lead storage battery, a nickel-metal hydride battery, a lithium-ion battery, and a sodium-sulfur battery, for example. The power storage unit 33 is not limited to a storage battery and may also include a capacitor. In the case where the power storage unit 33 includes a capacitor, charging and discharging can be performed in a short time compared to a storage battery or the like, which is advantageous in situations demanding high responsiveness. The power storage unit 33 stores power transmitted from the power reception coil 31 or transmits power to the onboard device 51 through the power converter 32.

The detector 34 includes a sensor such as a voltage sensor and a current sensor, for example. The detector 34 detects the power received wirelessly by the power reception coil 31.

The communication unit 55 includes one or more communication modules. The communication module(s) is a wired LAN communication module, a wireless LAN communication module, or a CAN communication module, for example. The communication unit 35 communicates with an external computer including the power transmission device 2 or the onboard device 51 or the like of the moving body 5 over a network such as the Internet.

The storage unit 36 is semiconductor memory, magnetic memory, or optical memory, for example. The storage unit 36 functions as main memory, auxiliary memory, or cache memory, for example. The storage unit 36 stores information of any type used in the operation of the power reception device 3. For example, the storage unit 36 stores a system program, an application program, embedded software, and the like.

The controller 37 includes one or more processors. The processor(s) may be a general-purpose processor such as a CPU or a dedicated processor specialized for a specific task, for example. The controller 37 is not limited to a processor and may also include one or more dedicated circuits. The dedicated circuit(s) may be an FPGA or an ASIC, for example. The controller 37 controls the power reception coil 31, power converter 32, power storage unit 33, detector 34, communication unit 35, and storage unit 36 described above to achieve the functions of the power reception device 3.

The controller 37 can measure the power being received wirelessly by the power reception device 3. Specifically, the controller 37 measures the strength of the power received wirelessly by the power reception coil 31 on the basis of the information detected by the detector 34. The strength of the power may be expressed by numerical information of any type, such as electric power, electric energy, voltage, current, magnetic flux, or magnetic flux density for example.

The controller 37 can transmit the power received wirelessly by the power reception device 3 to the onboard device 51 installed in the moving body 5. Specifically, the controller 37 can transmit power induced in the power reception coil 31 from the power reception coil 31 to the onboard device 51. Alternatively, the controller 37 may store the power induced in the power reception coil 31 in the power storage unit 33, and then transmit power from the power storage unit 33 to the onboard device 51.

(Example of Installing Power Transmission Device in Road)

Figure 7:
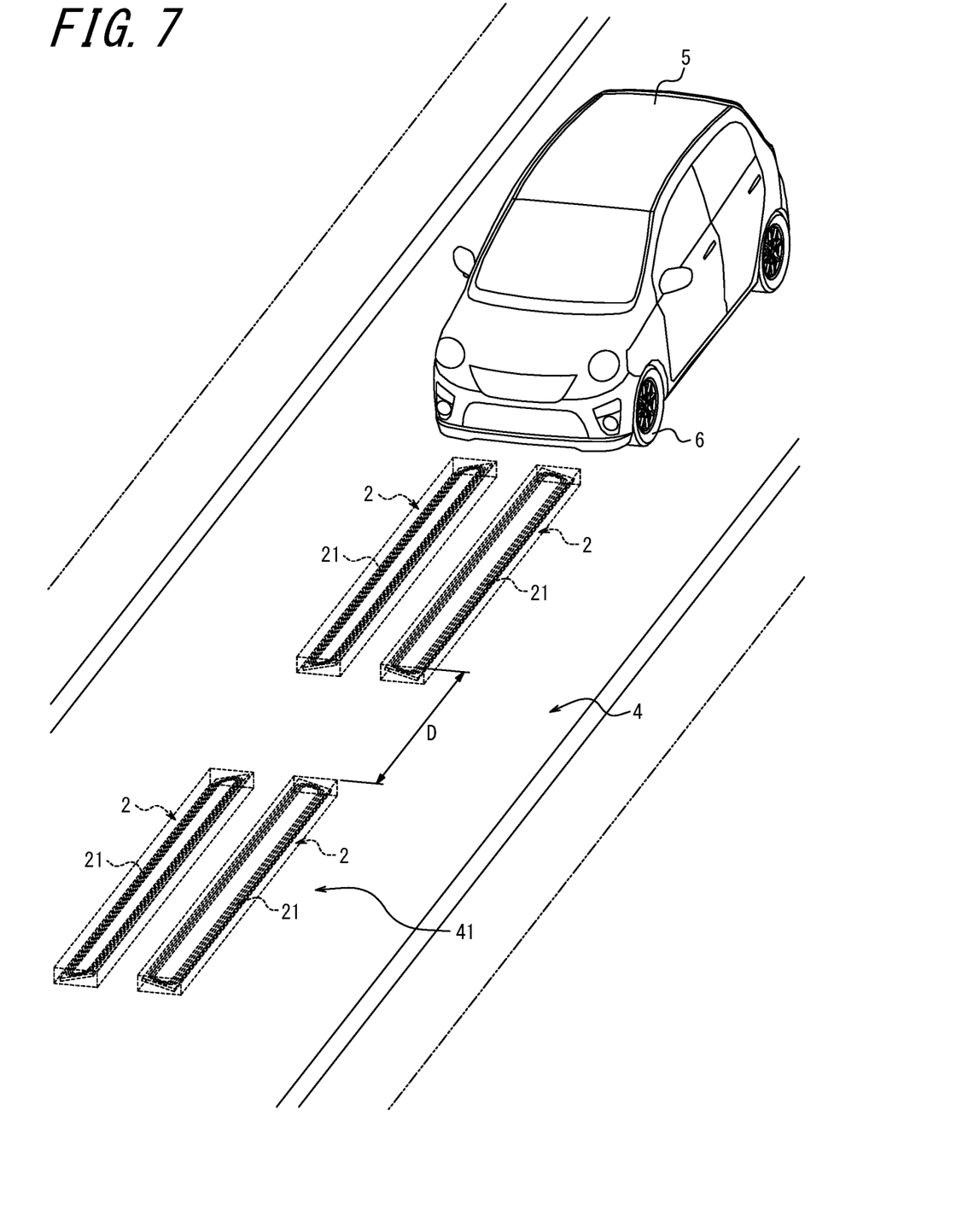
FIG. 7 is a schematic diagram illustrating an example of installing the power transmission device in a road in the wireless power transfer system according to an embodiment of the present disclosure.

Hereinafter, FIGS. 1 and 7 will be referenced to describe an example of installing the power transmission device 2 in the road 4 in the wireless power transfer system 1. FIG. 7 is a schematic diagram illustrating an example of installing the power transmission device in a road in the wireless power transfer system according to an embodiment of the present disclosure. FIG. 7 illustrates a perspective view of the wireless power transfer system 1 illustrated in FIG. 1.

In the present embodiment, a plurality of power transmission devices 2 are included in the wireless power transfer system 1. As illustrated in FIG. 7, the power transmission devices 2 are installed in multiple rows in the extension direction of the road 4. Furthermore, in a traffic lane 41 of the road 4, at least a pair of power transmission devices 2 are installed in the lateral direction of the traffic lane 41. As illustrated in FIG. 7, in the present embodiment, pairs of the power transmission devices 2 arranged in the lateral direction of the traffic lane 41 are installed at a predetermined spacing D in the extension direction of the road 4. The predetermined spacing D may be determined in any way.

As illustrated in FIG. 1, in a lateral cross section of the road 4, the coil planes S1 of the power transmission coils 21 are inclined farther upward in the direction perpendicular to the road surface while proceeding inward in the lateral direction of the traffic lane 41. Moreover, in a lateral cross section of the moving body 5, the coil planes S2 of the power reception coils 31 are inclined farther upward in the direction perpendicular to the contact patch of the wheels 6 with the road surface while proceeding inward in the lateral direction of the moving body 5. With this arrangement, in the wireless power transfer system 1, the power transmission devices 2 can be installed such that the wheels 6 do not travel on top of the power transmission devices 2. For this reason, the possibility of the wheels 6 traveling on top of the power transmission devices 2 and damaging the power transmission devices 2 due to the load from the wheels 6 as the moving body 5 travels on the road 4 can be lowered. Furthermore, the wireless power transfer system 1 can transmit power wirelessly from the inner side in the lateral direction of the moving body 5 to the power reception coils 31 of the power reception devices 3 of which at least a portion is housed in the wheels 6 of the moving body 5 traveling on the road 4. Consequently, the space between the power transmission coil 21 and the power reception coil 31 is surrounded by the road surface of the road 4, the moving body 5, and the wheel 6, and an obstacle will not come into the space as easily.

Figure 8:
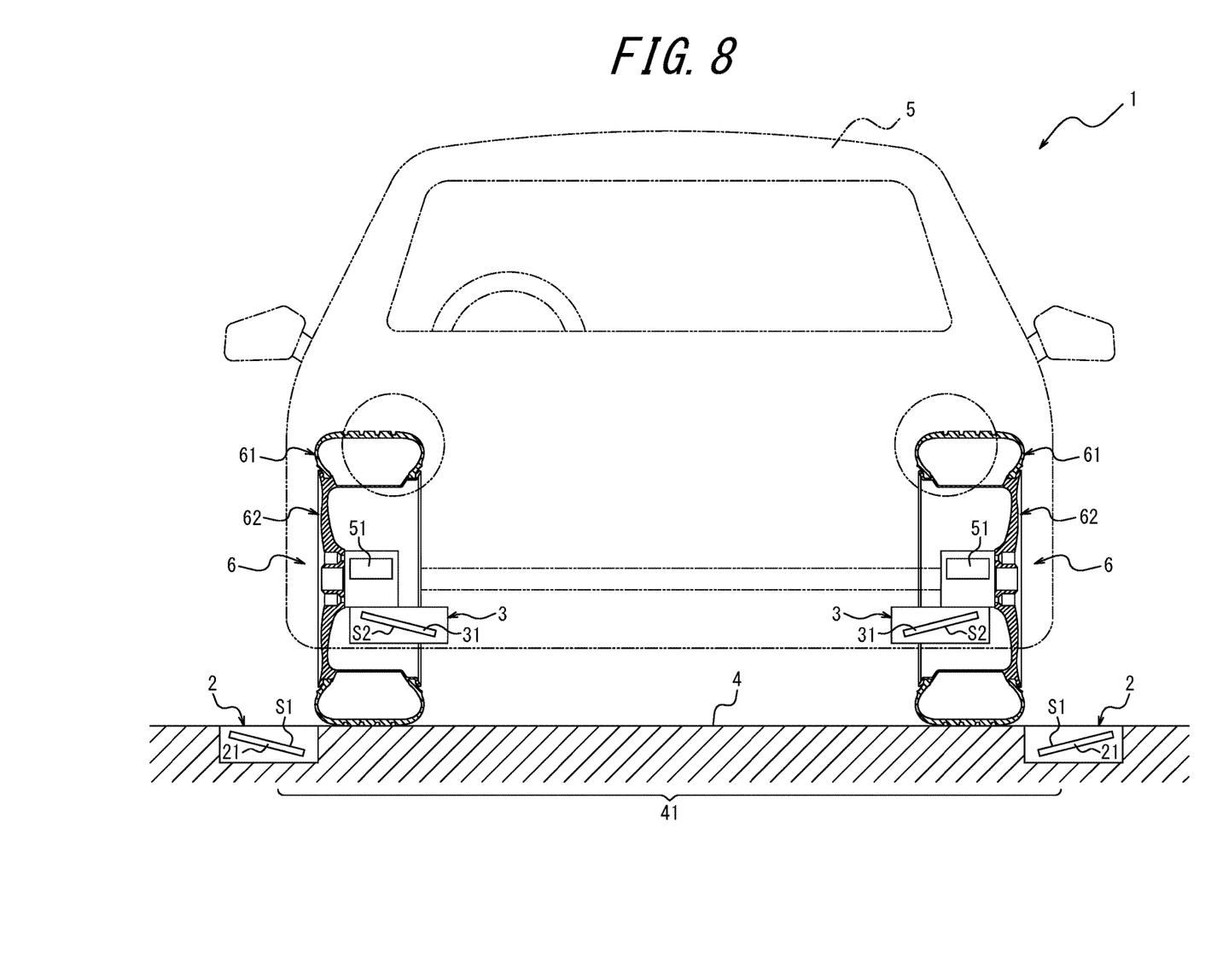
FIG. 8 is a schematic diagram that uses a lateral cross section of wheels to generally illustrate a modification of the wireless power transfer system according to an embodiment of the present disclosure.

Hereinafter, FIG. 8 will be referenced to describe a modification of the wireless power transfer system 1. FIG. 8 is a schematic diagram that uses a lateral cross section of wheels to generally illustrate a modification of the wireless power transfer system according to an embodiment of the present disclosure.

In the modification of the wireless power transfer system 1 illustrated in FIG. 8, in a lateral cross section of the road 4, the coil planes S1 of the power transmission coils 21 are inclined farther downward in the direction perpendicular to the road surface while proceeding inward in the lateral direction of the traffic lane 41. Moreover, in a lateral cross section of the moving body 5, the coil planes S2 of the power reception coils 31 are inclined farther downward in the direction perpendicular to the contact patch of the wheels 6 with the road surface while proceeding inward in the lateral direction of the moving body 5. With this arrangement, power can be transmitted wirelessly from the outer sides in the lateral direction of the moving body 5 to the power reception devices 3 housed in the wheels 6 of the moving body 5 traveling on the road 4. For this reason, the possibility of the wheels 6 traveling on top of the power transmission devices 2 and damaging the power transmission devices 2 due to the load from the wheels 6 as the moving body 5 travels on the road 4 can be lowered. For example, the power transmission devices 2 may be embedded underneath demarcation lines indicating the lateral edges of the traffic lane 41 of the road 4.

In the wireless power transfer system 1 and the modification of the wireless power transfer system 1 described above with reference to FIGS. 1 and 8, the power reception device 3 is configured such that the normal line of the coil plane S2 of the power reception coil 31 is inclined with respect to the normal line of the contact patch of the wheel 6 with the road surface in a lateral cross section of the moving body 5, but is not limited thereto. The coil plane S2 of the power reception coil 31 may also extend approximately parallel to the contact patch of the wheel 6 with the road surface in a lateral cross section of the moving body 5. With this arrangement, in the case where the installation position of the power transmission device 2 in the lateral direction of the road 4, the inclination of the power transmission coil 21 of the power transmission device 2 installed in the road 4, or the like is different depending on the road 4, as illustrated in FIG. 1 or 8, variations in the power reception efficiency of the power reception device 3 with respect to the power transmitted wirelessly from the power transmission device 2 can be reduced.

In this specification, a plane A and a plane B being "approximately parallel" means that the planes A and B are preferably parallel, for example. However, absolute parallelism is not necessary, and the planes A and B may also be inclined approximately within ±5 degrees of each other.

As described above, the wireless power transfer system 1 according to an embodiment of the present disclosure includes the power transmission device 2 and the power reception device 3. The power transmission device 2 is a power transmission device 2 installed in the road 4, is provided with the power transmission coil 21 that transmits power wirelessly, and is configured such that when installed in the road 4, the normal line of the coil plane of the power transmission coil 21 is inclined with respect to the normal line of the road surface of the road 4 in a lateral cross section of the road 4. The power reception device 3 is provided with the power reception coil 31 that receives power wirelessly, and at least a portion of the power reception coil 31 is housed in the wheel 6 of the moving body 5. According to the wireless power transfer system 1 having such a configuration, by housing at least a portion of the power reception coil 31 in the wheel 6 that directly contacts the road surface, the possibility that an obstacle will come into the space between the power transmission coil 21 provided in the road surface and the power reception coil 31 can be lowered. For this reason, the wireless power transfer system 1 can improve the power transfer efficiency in wireless power transfer. Furthermore, since the normal line of the coil plane of the power transmission coil 21 is inclined with respect to the normal line of the road surface, it is not necessary for the moving body 5 to travel such that the contact patch of the wheel 6 is positioned on top of the power transmission device 2 to make the coil plane S2 of the power reception coil 31 face the coil plane S1 of the power transmission coil 21. For this reason, the possibility of the wheel 6 traveling on top of the power transmission device 2 and damaging the power transmission device 2 due to the load from the wheel 6 as the moving body 5 travels on the road 4 can be lowered. Consequently, according to the wireless power transfer system 1 according to an embodiment of the present disclosure, the usefulness of the wireless power transfer technology for supplying power wirelessly to the moving body 5 is improved.

In the wireless power transfer system 1 according to an embodiment of the present disclosure, the power transmission coil 21 preferably is positioned lower than the road surface of the road 4 in the direction perpendicular to the road surface. According to such a configuration, in the wireless power transfer system 1, the possibility that the wheel 6 of the moving body 5 traveling on the road 4 will contact the power transmission coil 21 of the power transmission device 2 and damage the power transmission coil 21 can be lowered.

In the wireless power transfer system 1 according to an embodiment of the present disclosure, the road 4 is provided with at least one traffic lane 41, and in a lateral cross section of the road 4, the coil plane S1 of the power transmission coil 21 preferably is inclined farther upward in the direction perpendicular to the road surface while proceeding inward in the lateral direction of the traffic lane 41. According to such a configuration, in the wireless power transfer system 1, the power transmission device 2 can be installed such that the wheel 6 does not travel on top of the power transmission device 2. Consequently, in the wireless power transfer system 1, the possibility of the wheel 6 traveling on top of the power transmission device and damaging the power transmission device 2 due to the load from the wheel 6 as the moving body 5 travels on the road 4 can be lowered. Furthermore, in the wireless power transfer system 1, the power transmission device 2 can transmit power wirelessly from the inner side in the lateral direction of the moving body 5 to the power reception device 3 housed in the wheel 6 of the moving body 5 traveling on the road 4. Consequently, in the wireless power transfer system 1, the possibility that an obstacle will come into the space between the power transmission coil 21 and the power reception coil 31 during power transfer can be lowered further.

In the wireless power transfer system 1 according to an embodiment of the present disclosure, the road 4 is provided with at least one traffic lane 41, and in a lateral cross section of the road 4, the coil plane S1 of the power transmission coil 21 preferably is inclined farther downward in the direction perpendicular to the road surface while proceeding inward in the lateral direction of the traffic lane 41. According to such a configuration, in the wireless power transfer system 1, the power transmission device 2 can transmit power wirelessly from the outer side in the lateral direction of the moving body 5 to the power reception device 3 housed in the wheel 6 of the moving body 5 traveling on the road 4. Consequently, in the wireless power transfer system 1, the possibility of the wheel 6 traveling on top of the power transmission device 2 and damaging the power transmission device 2 due to the load from the wheel 6 as the moving body 5 travels on the road 4 can be lowered further.

In the wireless power transfer system 1 according to an embodiment of the present disclosure, a plurality of power transmission devices 2 preferably are installed in the extension direction of the road 4. According to such a configuration, in the wireless power transfer system 1, power can be transmitted from the plurality of power transmission devices 2 to the power reception device 3 housed in the wheel 6 of the moving body 5 traveling on the road 4.

In the wireless power transfer system 1 according to an embodiment of the present disclosure, the road 4 is provided with at least one traffic lane 41, and in the traffic lane 41, at least a pair of power transmission devices 2 preferably are installed in the lateral direction of the traffic lane 41. According to such a configuration, in the case where a plurality of wheels 6 are arranged and attached in the lateral direction of the moving body 5, such as in a four-wheeled vehicle, the wireless power transfer system 1 can transmit power wirelessly from each of the power transmission devices 2 to each of the wheels 6.

In the wireless power transfer system 1 according to an embodiment of the present disclosure, the power transmission device 2 preferably transmits power wirelessly in the case where the power reception device 3 is determined to exist at a position where power can be received from the power transmission device 2. According to such a configuration, it is possible to reduce the power consumption of the power transmission device 2 caused by the power transmission device 2 transmitting power wirelessly when the power reception device 3 does not exist at a position where power can be received.

In the wireless power transfer system 1 according to an embodiment of the present disclosure, the power reception device 3 preferably is configured such that the normal line of the coil plane S2 of the power reception coil 31 is inclined with respect to the normal line of the contact patch of the wheel 6 with the road surface in a lateral cross section of the moving body 5. According to such a configuration, in the wireless power transfer system 1, the power reception efficiency in the power reception device 3 can be improved with respect to the power transmitted from the power transmission device 2 in which the normal line of the coil plane S1 of the power transmission coil 21 is inclined with respect to the normal line of the road surface.

In the wireless power transfer system 1 according to an embodiment of the present disclosure, in a lateral cross section of the moving body 5, the coil plane S2 of the power reception coil 31 preferably is inclined farther upward in the direction perpendicular to the contact patch of the wheel 6 with the road surface while proceeding inward in the lateral direction of the moving body 5. According to such a configuration, in the wireless power transfer system 1, the power reception efficiency in the power reception device 3 can be improved with respect to the power transmitted wirelessly from the inner side in the lateral direction of the moving body 5 to the power reception device 3 of the moving body 5.

In the wireless power transfer system 1 according to an embodiment of the present disclosure, in a lateral cross section of the moving body 5, the coil plane S2 of the power reception coil 31 preferably are inclined farther downward in the direction perpendicular to the contact patch of the wheel 6 with the road surface while proceeding inward in the lateral direction of the moving body 5. According to such a configuration, in the wireless power transfer system 1, the power reception efficiency in the power reception device 3 can be improved with respect to the power transmitted wirelessly from the outer side in the lateral direction of the moving body 5 to the power reception device 3 of the moving body 5.

In the wireless power transfer system 1 according to an embodiment of the present disclosure, the coil plane of the power reception coil 31 preferably extends approximately parallel to the contact patch of the wheel 6 with the road surface in a lateral cross section of the moving body 5. According to such a configuration, in the wireless power transfer system 1, in the case where the installation position of the power transmission device 2 in the lateral direction of the road 4, the inclination of the power transmission coil 21 of the power transmission device 2 installed in the road 4, or the like is different depending on the road 4, variations in the power reception efficiency of the power reception device 3 with respect to the power transmitted wirelessly from the power transmission device 2 can be reduced.

In the wireless power transfer system 1 according to an embodiment of the present disclosure, the wheel 6 preferably is a tire and wheel assembly including the tire 61 and the wheel 62. According to such a configuration, in the wireless power transfer system 1, by using the tire 61 and the wheel 62 to partition the interior space of the wheel 6 from the outside of the wheel 6, the possibility that an obstacle will come into the space between the power transmission coil 21 and the power reception coil 31 can be lowered.

The power transmission device 2 according to an embodiment of the present disclosure is provided with the power transmission coil 21 that transmits power wirelessly, and is configured such that when installed in the road 4, the normal line of the coil plane S1 of the power transmission coil 21 is inclined with respect to the normal line of the road surface of the road 4 in a lateral cross section of the road 4. According to such a configuration, the power transmission device 2 can transmit power wirelessly while the moving body 5 provided with the power reception device 3 travels on the road 4. Furthermore, the possibility of the wheel 6 of the moving body 5 traveling on top of the power transmission device 2 and damaging the power transmission device 2 due to the load from the wheel 6 as the moving body 5 travels on the road 4 can be lowered. Consequently, according to the power transmission device 2 according to an embodiment of the present disclosure, the usefulness of the wireless power transfer technology for supplying power wirelessly to the moving body 5 is improved.

The power reception device 3 according to an embodiment of the present disclosure is provided with the power reception coil 31 that receives power wirelessly, and is configured such that in the state in which at least a portion of the power reception coil 31 is housed in the wheel 6 of the moving body 5, the normal line of the coil plane S2 of the power reception coil 31 is inclined with respect to the normal line of the contact patch of the wheel 6 with the road surface in a lateral cross section of the moving body 5. According to such a configuration, the power reception device 3 can receive power wirelessly from the power transmission device 2 installed in the road 4 while the moving body 5 travels on the road 4. With this arrangement, the power reception device 3 can receive power for driving the moving body 5 from outside the moving body 5, thereby making it possible to reduce the size and weight of the storage battery installed in the moving body 5, and by extension, improve the energy efficiency of the moving body 5. Consequently, according to the power reception device 3 according to an embodiment of the present disclosure, the usefulness of the wireless power transfer technology for supplying power wirelessly to the moving body 5 is improved.

The present disclosure has been described on the basis of the drawings and embodiments, but it should be noted that a person skilled in the art could make various modifications and revisions on the basis of the present disclosure. Consequently, it should be appreciated that any such modifications or revisions are included in the scope of the present disclosure. For example, the components, functions, and the like included in each embodiment or practical example may be rearranged in logically non-contradictory ways. Moreover, the components, functions, and the like included in each embodiment can be used in combination with another embodiment or practical example, and a plurality of components, functions, and the like may be combined into one, divided, or partially omitted.

For example, in the embodiment described above, some or all of the functions or processes described as functions or processes of the controller 27 of the power transmission device 2 or the controller 37 of the power reception device 3 may also be achieved as functions or processes of a general-purpose computer such as a smartphone or a personal computer, for example. Specifically, a program stating processing content for achieving each function of the controller 27 of the power transmission device 2 or the controller 37 of the power reception device 3 according to the present embodiment can be stored in a memory of a computer, and the program can be read out and executed by a processor of the computer. Consequently, the technology according to the present embodiment is also achievable as a program executable by a processor. For example, a control device (electronic control unit (ECU)) of the moving body 5 may be configured to function as the controller 37 of the power reception device 3.

Furthermore, in the embodiment described above, the power transmission device 2 and the power reception device 3 may also be configured such that some or all of the operations and processes executed by the controller 27 of the power transmission device 2 are executed by the controller 37 of the power reception device 3. For example, when the moving body 5 travels on the road 4 in which the power transmission device 2 is installed, the controller 37 of the power reception device 3 may control the power transmission device 2 and cause power to be transmitted wirelessly to the power transmission device 2.

As another example, in the embodiment described above, the tire 61 is described as being filled with air, but is not limited thereto. For example, the tire 61 may be filled with a gas such as nitrogen. As another example, instead of or in addition to air, the tire 61 may be filled with any fluid, such as a liquid, a gelatinous material, or particulate matter.

REFERENCE SIGNS LIST 1 wireless power transfer system
2 power transmission device
21 power transmission coil
211 supporting member
22 power converter
23 power storage unit
24 detector
25 communication unit
26 storage unit
27 controller
3 power reception device
31 power reception coil 311 supporting member
32 power converter
33 power storage unit
34 detector
35 communication unit
36 storage unit
37 controller
4 road
41 traffic lane
5 moving body
51 onboard device
52 shaft
6 wheel
61 tire
611 bead portion
612 sidewall portion
613 tread portion
62 wheel
621 rim portion
622 hub portion
623 disc portion
P power source
S1, S2 coil plane
θ1, θ2 inclination
V perpendicular direction

The invention claimed is:

1. A wireless power transfer system comprising:
a power transmission device installed in a road and provided with a power transmission coil configured to transmit power wirelessly, the power transmission device being configured such that in a state installed in the road, the normal line of a coil plane of the power transmission coil is inclined with respect to the normal line of a road surface of the road in a lateral cross section of the road; and
a power reception device provided with a power reception coil configured to receive power wirelessly, at least a portion of the power reception coil being housed in a wheel of a moving body, wherein
the road is provided with at least one traffic lane, and
in the lateral cross section of the road, the coil plane of the power transmission coil is inclined farther upward or downward in the direction perpendicular to the road surface while proceeding inward in the lateral direction of the traffic lane.

2. The wireless power transfer system according to claim 1, wherein
the power transmission coil is positioned lower than the road surface of the road in the direction perpendicular to the road surface.

3. The wireless power transfer system according to claim 2, wherein
the power transmission device is installed in a plurality of rows in an extension direction of the road.

4. The wireless power transfer system according to claim 2, wherein
in the traffic lane, at least a pair of power transmission devices are installed in the lateral direction of the traffic lane.

5. The wireless power transfer system according to claim 2, wherein
the power transmission device is configured to transmit power wirelessly upon determining that the power reception device exists at a position where the power reception device can receive power from the power transmission device.

6. The wireless power transfer system according to claim 2, wherein
the power reception device is configured such that the normal line of a coil plane of the power reception coil is inclined with respect to the normal line of a contact patch of the wheel with the road surface in a lateral cross section of the moving body.

7. The wireless power transfer system according to claim 1, wherein
the power transmission device is installed in a plurality of rows in an extension direction of the road.

8. The wireless power transfer system according to claim 1, wherein
in the traffic lane, at least a pair of power transmission devices are installed in the lateral direction of the traffic lane.

9. The wireless power transfer system according to claim 1, wherein
the power transmission device is configured to transmit power wirelessly upon determining that the power reception device exists at a position where the power reception device can receive power from the power transmission device.

10. The wireless power transfer system according to claim 1, wherein
the power reception device is configured such that the normal line of a coil plane of the power reception coil is inclined with respect to the normal line of a contact patch of the wheel with the road surface in a lateral cross section of the moving body.

11. The wireless power transfer system according to claim 10, wherein
in a lateral cross section of the moving body, the coil plane of the power reception coil is inclined farther upward in the direction perpendicular to the contact patch of the wheel with the road surface while proceeding inward in the lateral direction of the moving body.

12. The wireless power transfer system according to claim 11, wherein
in a lateral cross section of the moving body, the coil plane of the power reception coil is inclined farther downward in the direction perpendicular to the contact patch of the wheel with the road surface while proceeding inward in the lateral direction of the moving body.

13. The wireless power transfer system according to claim 1, wherein
a coil plane of the power reception coil extends approximately parallel to a contact patch of the wheel with the road surface in a lateral cross section of the moving body.

14. The wireless power transfer system according to claim 1, wherein
the wheel is a tire and wheel assembly including a tire and a wheel.

15. A power transmission device installed in a road, the power transmission device comprising:
a power transmission coil configured to transmit power wirelessly, wherein
the power transmission device is configured such that in a state installed in the road, the normal line of a coil plane of the power transmission coil is inclined with respect to the normal line of a road surface of the road in a lateral cross section of the road,
the road is provided with at least one traffic lane, and
in the lateral cross section of the road, the coil plane of the power transmission coil is inclined farther upward or downward in the direction perpendicular to the road surface while proceeding inward in the lateral direction of the traffic lane.

16. A power reception device comprising:

a power reception coil configured to receive power wirelessly, wherein the power reception device is configured such that in a state in which at least a portion of the power reception coil is housed in a wheel of a moving body, the normal line of a coil plane of the power reception coil is inclined with respect to the normal line of a contact patch of the wheel with a road surface in a lateral cross section of the moving body.

\* \* \* \* \*